US009031308B2

(12) United States Patent
Sandoz et al.

(10) Patent No.: US 9,031,308 B2
(45) Date of Patent: May 12, 2015

(54) SYSTEMS AND METHODS FOR RECREATING AN IMAGE USING WHITE SPACE AND CHECK ELEMENT CAPTURE

(71) Applicant: Bank of America Corporation, Charlotte, NC (US)

(72) Inventors: Eric Scott Sandoz, Concord, CA (US); Deborah N. Bennett, Conyers, GA (US); Timmy L. Gauvin, Peachtree City, GA (US); Craig David Palmer, Mint Hill, NC (US); Michael Gerald Smith, Fort Mill, SC (US); Geoffrey Reed Williams, Midlothian, TX (US); Lisa Gibson, Newnan, GA (US); Melvin Gregory Nixon, Lake Wylie, SC (US)

(73) Assignee: Bank of America Corporation, Charlotte, NC (US)

( * ) Notice: Subject to any disclaimer, the term of this patent is extended or adjusted under 35 U.S.C. 154(b) by 195 days.

(21) Appl. No.: 13/768,758

(22) Filed: Feb. 15, 2013

(65) Prior Publication Data

US 2014/0233835 A1 Aug. 21, 2014

(51) Int. Cl.
*G06K 9/00* (2006.01)
*G06Q 40/00* (2012.01)

(52) U.S. Cl.
CPC .................... *G06K 9/00442* (2013.01)

(58) Field of Classification Search
USPC ......... 382/100, 103, 112–116, 135–140, 151, 382/155, 162, 168, 173, 181, 187–188, 199, 382/209, 216–219, 232, 254, 274, 276, 382/284–301, 305, 312; 194/207; 235/379; 715/838; 705/44, 45; 713/193
See application file for complete search history.

(56) References Cited

U.S. PATENT DOCUMENTS

| 7,702,588 B2 * | 4/2010 | Gilder et al. .................... 705/44 |
| 7,814,336 B1 * | 10/2010 | Nisbet et al. .................. 713/193 |
| 8,045,784 B2 * | 10/2011 | Price et al. .................... 382/137 |
| 8,474,704 B1 * | 7/2013 | Grimm et al. ................. 235/379 |
| 2010/0122216 A1 * | 5/2010 | Song et al. .................... 715/838 |

* cited by examiner

*Primary Examiner* — Seyed Azarian
(74) *Attorney, Agent, or Firm* — Michael A. Springs; Moore & Van Allen PLLC; Nicholas C. Russell

(57) ABSTRACT

Embodiments of the present invention relates to systems, computer-implemented methods, and computer program products for capturing and storing elements of a negotiable instrument for use in image recreation. In some embodiments, a method is provided that includes: (a) receive an image of the negotiable instrument, wherein the image of the negotiable instrument comprises one or more elements that are used for processing the negotiable instrument and non-element portions that are not used in processing the negotiable instrument; (b) capture, using the image capture device, images of one or more elements of the negotiable instrument; (c) store the images of the one or more elements of the negotiable instrument in the database; and (d) store, as white space, the non-element portions of the image of the negotiable instrument in the database.

17 Claims, 8 Drawing Sheets

SYSTEMS AND METHODS FOR RECREATING AN IMAGE USING WHITE SPACE AND CHECK ELEMENT CAPTURE

BACKGROUND

Today, many financial institutions are required by federal and some state regulations to maintain image file records of all deposited checks and other negotiable instruments. In many instances, financial institutions are required to maintain this information for up to seven years. Currently, in the domestic market, tens of billions of dollars in checks are processed every year. The result of such a high volume of check processing by banks and other financial institutions is that very large amounts of storage space is required for properly maintaining image file records as required by law. Thus, there is a need to provide systems, methods, and computer program products that enable financial institutions to reduce the amount of storage space required for maintaining image file records of deposited checks and other negotiable instruments.

BRIEF SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Brief Summary of Check Imaging Bifurcation/Separation

Some embodiments of the present invention provide a system that includes: an image capture device; a database; and a processing device in communication with the capture device and the database, wherein the processing device is used to: (a) receive an image of the negotiable instrument, wherein the image of the negotiable instrument comprises one or more elements that are used for processing the negotiable instrument and non-element portions that are not used in processing the negotiable instrument; (b) capture, using the image capture device, images of one or more elements of the negotiable instrument; (c) store the images of the one or more elements of the negotiable instrument in the database; and (d) store, as white space, the non-element portions of the image of the negotiable instrument in the database.

In some embodiments of the system, the processing device is further configured to generate a second image of the negotiable instrument using the images of the one or more elements of the negotiable instrument and the non-element portions of the image of the negotiable instrument that was previously stored as white space.

In some embodiments of the system the processing device is further configured to store the non-element portions of the negotiable instrument in an image resolution lower than an image resolution of the non-element portions of the negotiable instrument.

In some embodiments of the system, the processing device is further configured to separate the elements of the negotiable instrument and the non-element portions of the negotiable instrument into a plurality of quadrants, wherein the processing device stores the quadrants comprising elements of the negotiable instrument in a first image resolution and the quadrants comprising non-element portions of the negotiable instrument in a second image resolution.

In some embodiments of the system, the processing device is further configured to bifurcate the one or more images of the elements of the negotiable instrument and the non-element portions of the negotiable instrument such that the one or more images of the elements of the negotiable instrument can be stored with a higher image quality than the non-element portions of the negotiable instrument.

In some embodiments of the system, the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

In some embodiments of the system, the generated second image of the negotiable instrument comprises a first portion with a first image resolution and a second portion with a second image resolution.

In some embodiments a computer-implemented method for capturing and storing elements of a negotiable instrument for use in image recreation is provided that includes: (a) receive an image of the negotiable instrument, wherein the image of the negotiable instrument comprises one or more elements that are used for processing the negotiable instrument and non-element portions that are not used in processing the negotiable instrument; (b) capture, using the image capture device, images of one or more elements of the negotiable instrument; (c) store the images of the one or more elements of the negotiable instrument in the database; and (d) store, as white space, the non-element portions of the image of the negotiable instrument in the database.

In some embodiments of the method, the computer processor is further executing computer-readable instruction code specifically configured to cause the computer processor to generate a second image of the negotiable instrument using the images of the one or more elements of the negotiable instrument and the non-element portions of the image of the negotiable instrument that was previously stored as white space.

In some embodiments of the method, the computer processor is further executing computer-readable instruction code specifically configured to cause the computer processor to store the non-element portions of the negotiable instrument in an image resolution lower than an image resolution of the non-element portions of the negotiable instrument.

In some embodiments of the method, the computer processor is further executing computer-readable instruction code specifically configured to cause the computer processor to separate the elements of the negotiable instrument and the non-element portions of the negotiable instrument into a plurality of quadrants, wherein the processing device stores the quadrants comprising elements of the negotiable instrument in a first image resolution and the quadrants comprising non-element portions of the negotiable instrument in a second image resolution.

In some embodiments of the method, the computer processor is further executing computer-readable instruction code specifically configured to cause the computer processor to bifurcate the one or more images of the elements of the negotiable instrument and the non-element portions of the negotiable instrument such that the one or more images of the elements of the negotiable instrument can be stored with a higher image quality than the non-element portions of the negotiable instrument.

In some embodiments of the method, the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

In some embodiments of the method, the generated second image of the negotiable instrument comprises a first portion with a first image resolution and a second portion with a second image resolution.

In some embodiments of the present invention a computer program product for capturing and storing elements of a negotiable instrument for use in image recreation is provided that includes a non-transitory computer-readable medium, wherein the non-transitory computer-readable medium comprises one or more computer-executable program code portions that, when executed by a computer, cause the computer to: (a) receive an image of the negotiable instrument, wherein the image of the negotiable instrument comprises one or more elements that are used for processing the negotiable instrument and non-element portions that are not used in processing the negotiable instrument; (b) capture, using the image capture device, images of one or more elements of the negotiable instrument; (c) store the images of the one or more elements of the negotiable instrument in the database; and (d) store, as white space, the non-element portions of the image of the negotiable instrument in the database.

In some embodiments of the computer program product, the one or more computer-executable program code portions, when executed by the computer, cause the computer to generate a second image of the negotiable instrument using the images of the one or more elements of the negotiable instrument and the non-element portions of the image of the negotiable instrument that was previously stored as white space.

In some embodiments of the computer program product, the one or more computer-executable program code portions, when executed by the computer, cause the computer to store the non-element portions of the negotiable instrument in an image resolution lower than an image resolution of the non-element portions of the negotiable instrument.

In some embodiments of the computer program product, the one or more computer-executable program code portions, when executed by the computer, cause the computer to separate the elements of the negotiable instrument and the non-element portions of the negotiable instrument into a plurality of quadrants, wherein the processing device stores the quadrants comprising elements of the negotiable instrument in a first image resolution and the quadrants comprising non-element portions of the negotiable instrument in a second image resolution.

In some embodiments of the computer program product, the one or more computer-executable program code portions, when executed by the computer, cause the computer to bifurcate the one or more images of the elements of the negotiable instrument and the non-element portions of the negotiable instrument such that the one or more images of the elements of the negotiable instrument can be stored with a higher image quality than the non-element portions of the negotiable instrument.

In some embodiments of the computer program product, the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

Brief Summary of Check Image Thumbnail

Some embodiments of the present invention provide a system that includes: an image capture device; a database; and a processing device in communication with the capture device and the database, wherein the processing device is used to: (a) receive an image of the negotiable instrument, wherein the image of the negotiable instrument comprises one or more elements that are used for processing the negotiable instrument; (b) capture, using the image capture device, images of one or more elements of the negotiable instrument; (c) generate a thumbnail image of the negotiable instrument based at least partially on an image of the negotiable instrument; and (d) store the images of the one or more elements of the negotiable instrument and the thumbnail image of the negotiable instrument in the database.

In some embodiments of the system, the processing device is further configured to generate a second image of the negotiable instrument using the images of the one or more elements of the negotiable instrument and the thumbnail image of the negotiable instrument.

In some embodiments of the system, the generating the thumbnail image of the negotiable instrument comprises de-enhancing a copy of or the received image of the negotiable instrument such that the thumbnail image resulting from the de-enhancing is, at least, one of a smaller size than the receive image of the negotiable instrument, a reduced file size than the received image of the negotiable instrument, or a reduced image quality than the received negotiable instrument.

In some embodiments of the system, the thumbnail image of the negotiable instrument is generated in real-time or substantially real-time as the image of the negotiable instrument is received or captured.

In some embodiments of the system, generating the second image of the negotiable instrument comprises re-enhancing the thumbnail image of the negotiable instrument by enlarging the thumbnail image to a size substantially similar to an original size of the image of the received negotiable instrument.

In some embodiments of the system, the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

In some embodiments of the system, re-enhancing the thumbnail comprises, at least, integrating or adding to the enlarged thumbnail image the image of the one or more elements of the negotiable instrument.

In some embodiments a computer-implemented method for capturing and storing elements of a negotiable instrument for use in image recreation is provided that includes: (a) receive an image of the negotiable instrument, wherein the image of the negotiable instrument comprises one or more elements that are used for processing the negotiable instrument; (b) capture, using the image capture device, images of one or more elements of the negotiable instrument; (c) generate a thumbnail image of the negotiable instrument based at least partially on an image of the negotiable instrument; and (d) store the images of the one or more elements of the negotiable instrument and the thumbnail image of the negotiable instrument in the database.

In some embodiments of the method, the computer processor is further executing computer-readable instruction code specifically configured to cause the computer processor to generate a second image of the negotiable instrument using the images of the one or more elements of the negotiable instrument and the thumbnail image of the negotiable instrument.

In some embodiments of the method, the generating the thumbnail image of the negotiable instrument comprises de-enhancing a copy of or the received image of the negotiable instrument such that the thumbnail image resulting from the de-enhancing is, at least, one of a smaller size than the receive image of the negotiable instrument, a reduced file size than the received image of the negotiable instrument, or a reduced image quality than the received negotiable instrument.

In some embodiments of the method, the thumbnail image of the negotiable instrument is generated in real-time or substantially real-time as the image of the negotiable instrument is received or captured.

In some embodiments of the method, generating the second image of the negotiable instrument comprises re-enhancing the thumbnail image of the negotiable instrument by enlarging the thumbnail image to a size substantially similar to an original size of the image of the received negotiable instrument.

In some embodiments of the method, the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

In some embodiments of the method, the generated second image of the negotiable instrument comprises a first portion with a first image resolution and a second portion with a second image resolution.

In some embodiments of the present invention a computer program product for capturing and storing elements of a negotiable instrument for use in image recreation is provided that includes a non-transitory computer-readable medium, wherein the non-transitory computer-readable medium comprises one or more computer-executable program code portions that, when executed by a computer, cause the computer to: (a) receive an image of the negotiable instrument, wherein the image of the negotiable instrument comprises one or more elements that are used for processing the negotiable instrument; (b) capture, using the image capture device, images of one or more elements of the negotiable instrument; (c) generate a thumbnail image of the negotiable instrument based at least partially on an image of the negotiable instrument; and (d) store the images of the one or more elements of the negotiable instrument and the thumbnail image of the negotiable instrument in the database.

In some embodiments of the computer program product, the one or more computer-executable program code portions, when executed by the computer, cause the computer to generate a second image of the negotiable instrument using the images of the one or more elements of the negotiable instrument and the thumbnail image of the negotiable instrument.

In some embodiments of the computer program product, the one or more computer-executable program code portions, when executed by the computer, cause the computer to store the non-element portions of the negotiable instrument in an image resolution lower than an image resolution of the non-element portions of the negotiable instrument.

In some embodiments of the computer program product, the generating the thumbnail image of the negotiable instrument comprises de-enhancing a copy of or the received image of the negotiable instrument such that the thumbnail image resulting from the de-enhancing is, at least, one of a smaller size than the receive image of the negotiable instrument, a reduced file size than the received image of the negotiable instrument, or a reduced image quality than the received negotiable instrument.

In some embodiments of the computer program product, the thumbnail image of the negotiable instrument is generated in real-time or substantially real-time as the image of the negotiable instrument is received or captured.

In some embodiments of the computer program product, generating the second image of the negotiable instrument comprises re-enhancing the thumbnail image of the negotiable instrument by enlarging the thumbnail image to a size substantially similar to an original size of the image of the received negotiable instrument.

In some embodiments of the computer program product, the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

BRIEF DESCRIPTION OF THE DRAWINGS

Figure 1:
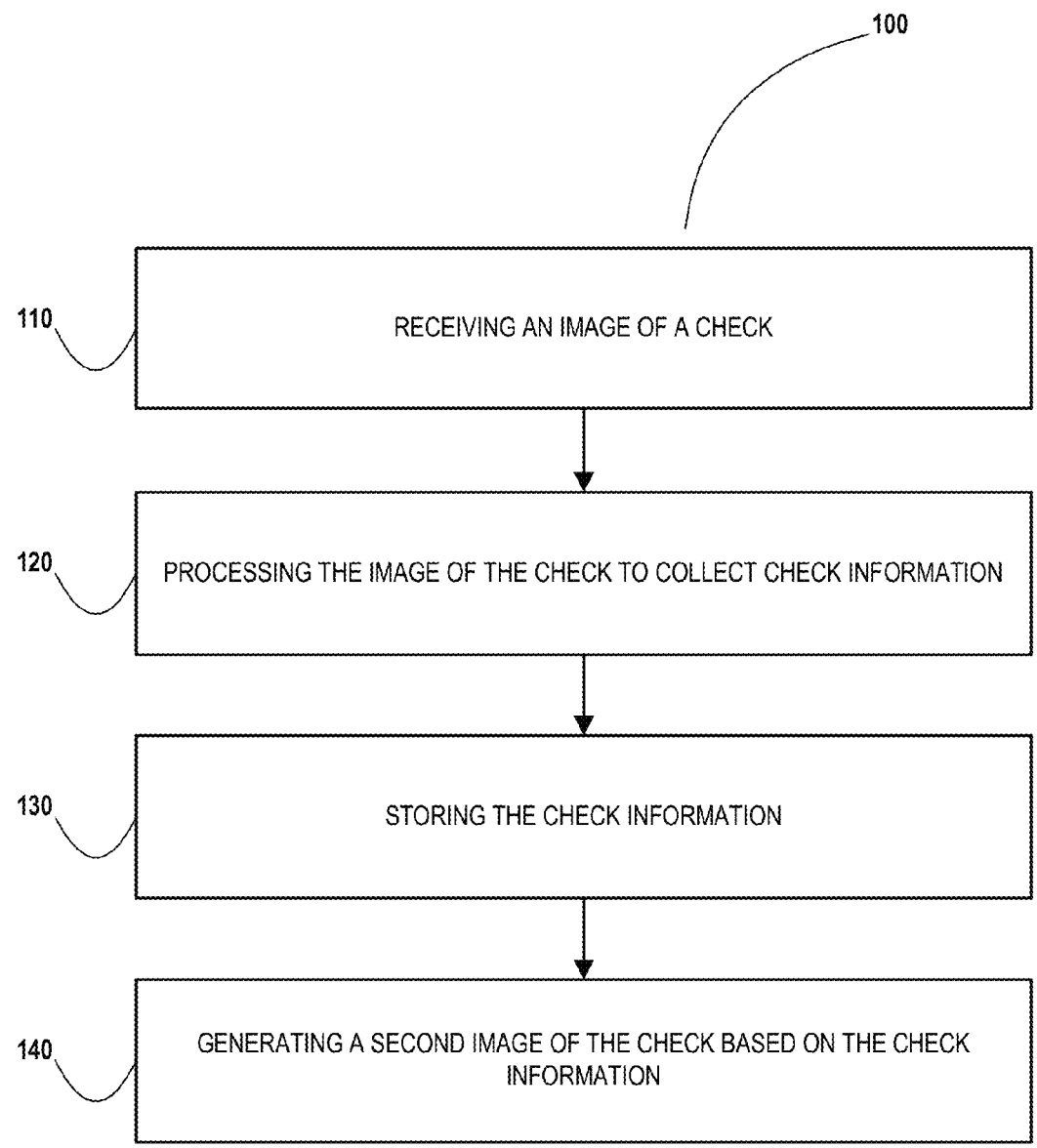

Having thus described embodiments of the invention in general terms, reference will now be made to the accompanying drawings, which are not necessarily drawn to scale, and wherein:

FIG. 1 illustrates a general process flow for image recreation using white space and images of check elements, in accordance with some embodiments of the invention.

Figure 2:
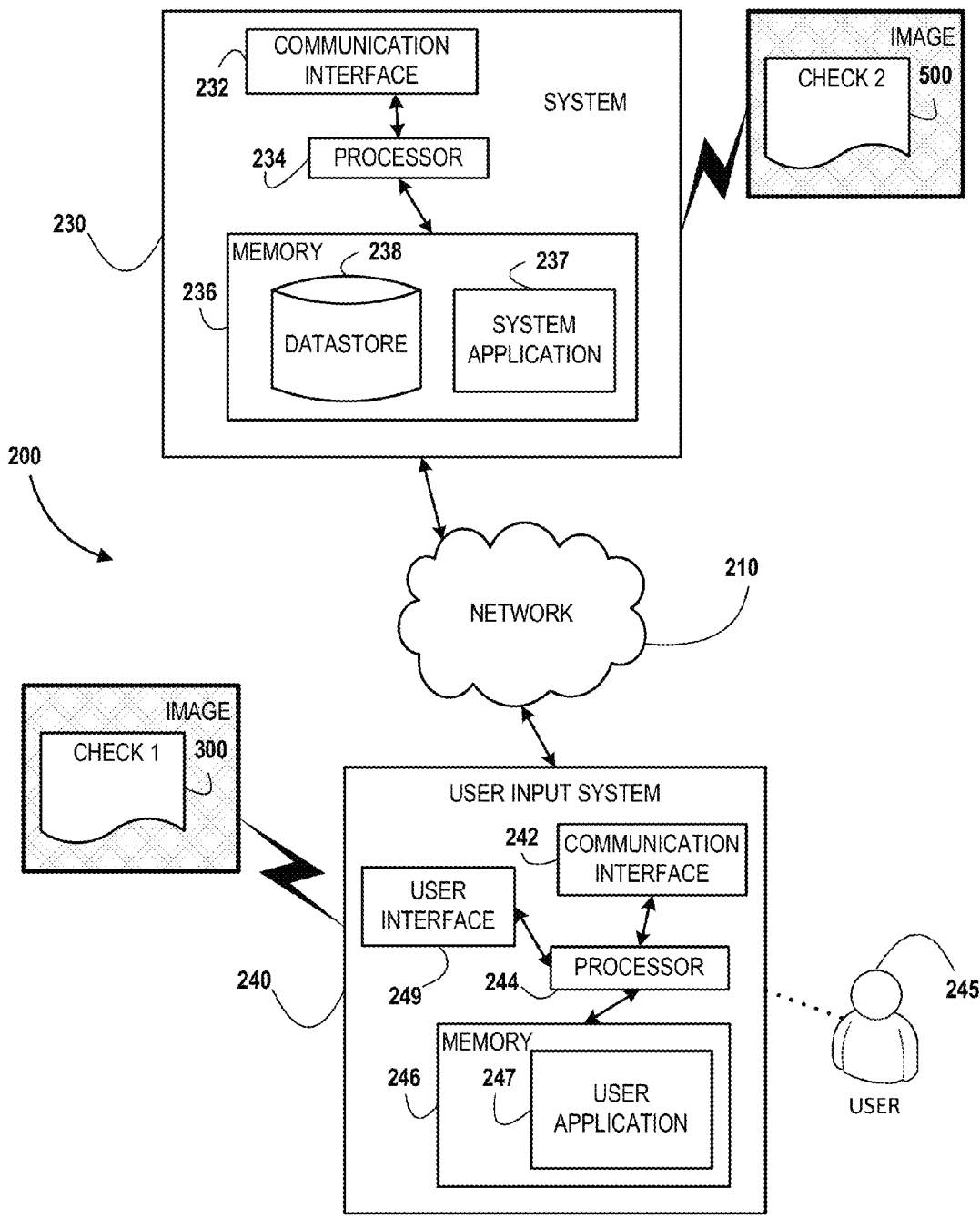

FIG. 2 is a block diagram illustrating an environment for implementing embodiments of the invention including the process flows described herein.

Figure 3:
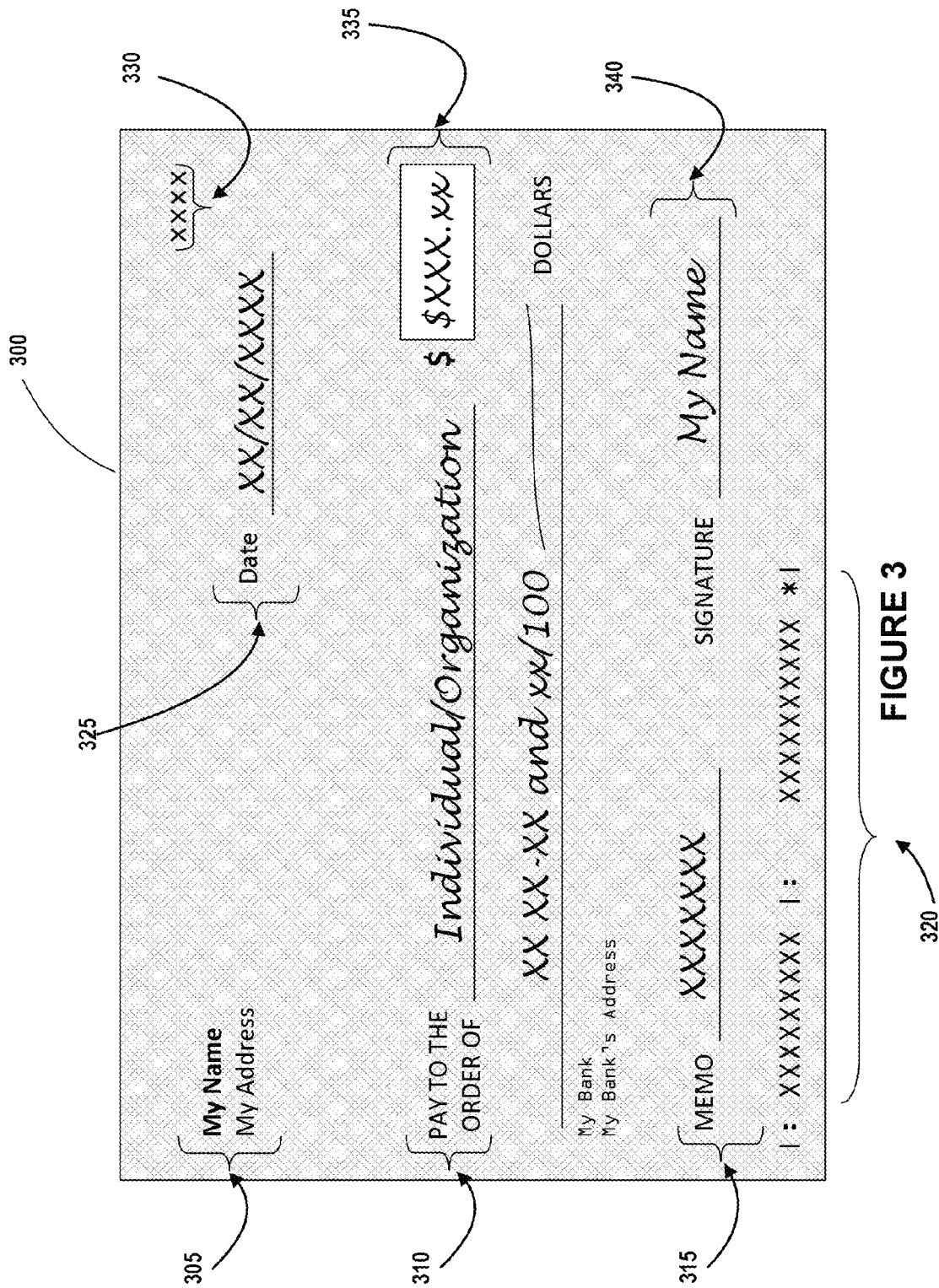

FIG. 3 illustrates a diagram of check, in accordance with some embodiments of the present invention.

Figure 4:
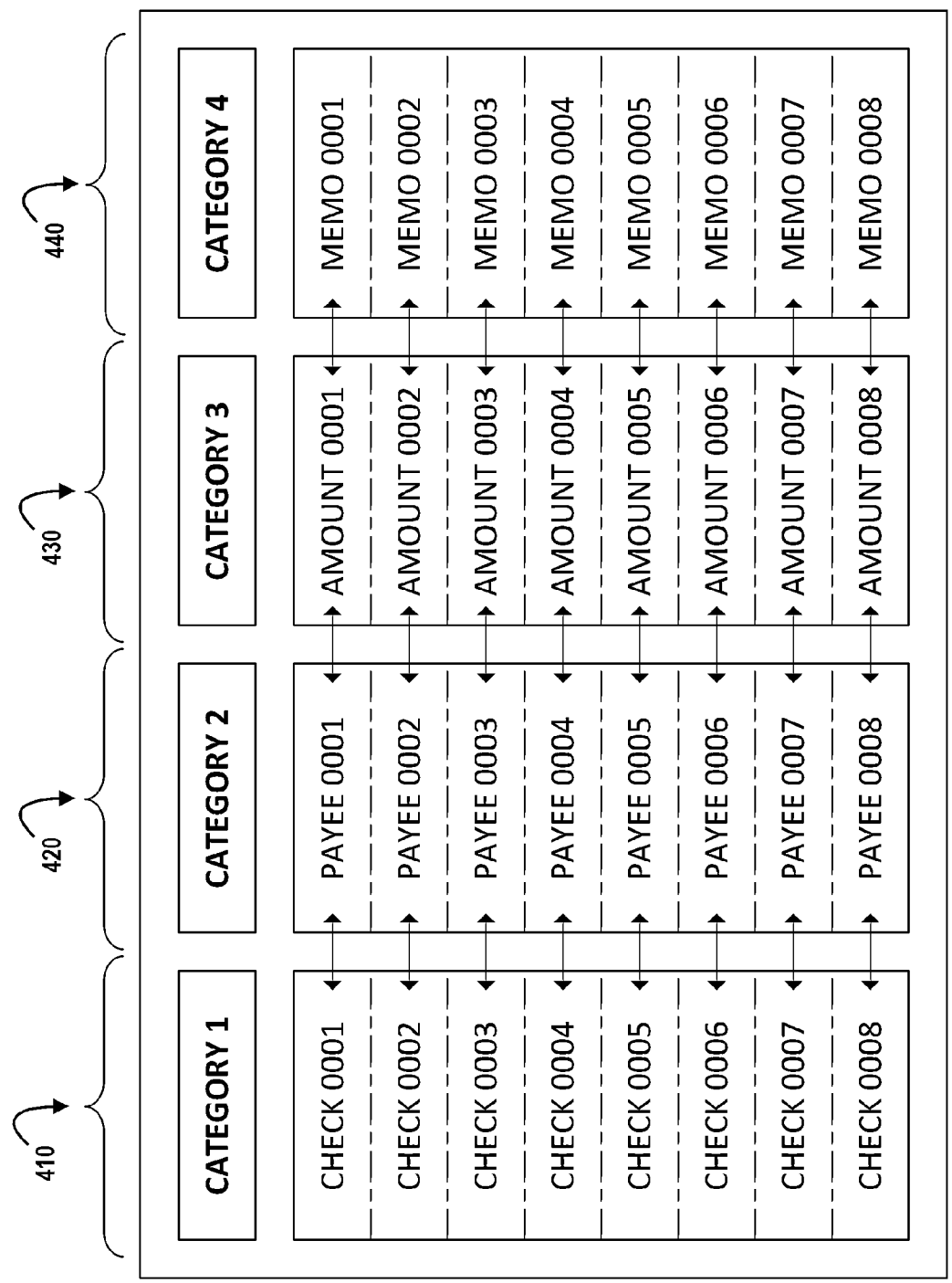

FIG. 4 illustrates a datastore for storing check information, in accordance with some embodiments of the present invention.

Figure 5:
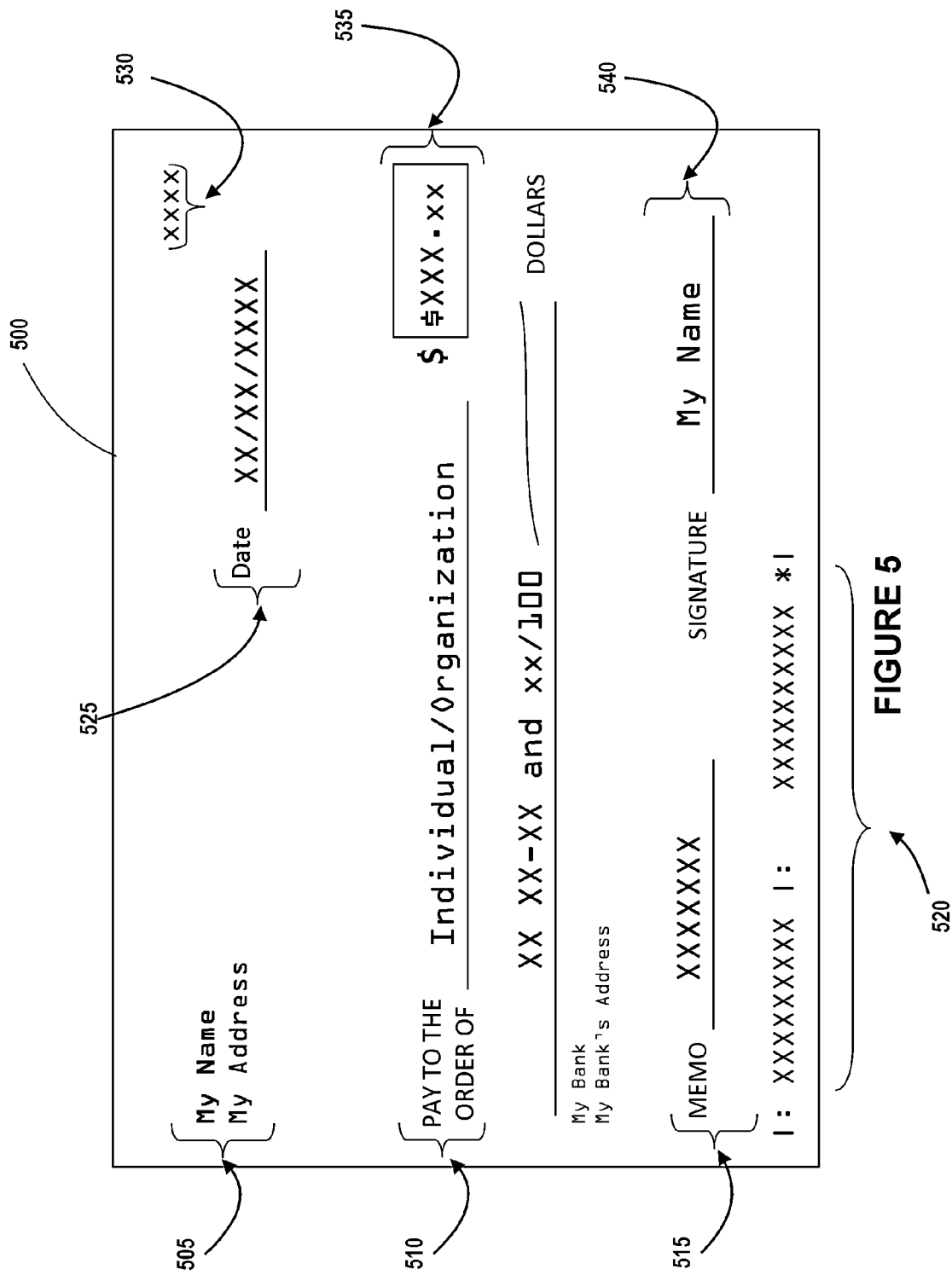

FIG. 5 illustrates an image of a check, in accordance with some embodiments of the present invention.

Figure 6:
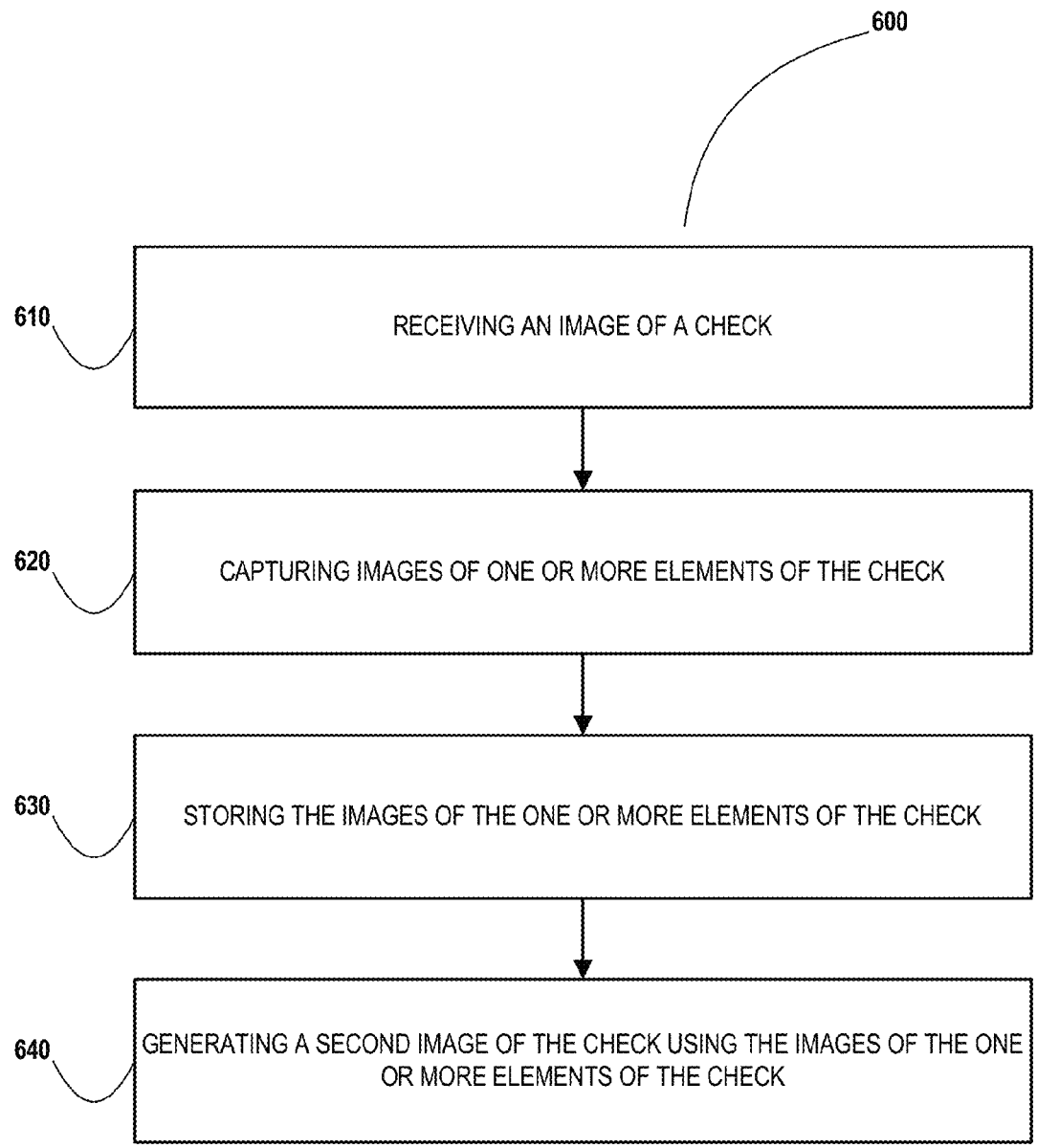

FIG. 6 illustrates a more detailed process flow for image recreation using white space and images of check elements, in accordance with some embodiments of the present invention.

Figure 7:
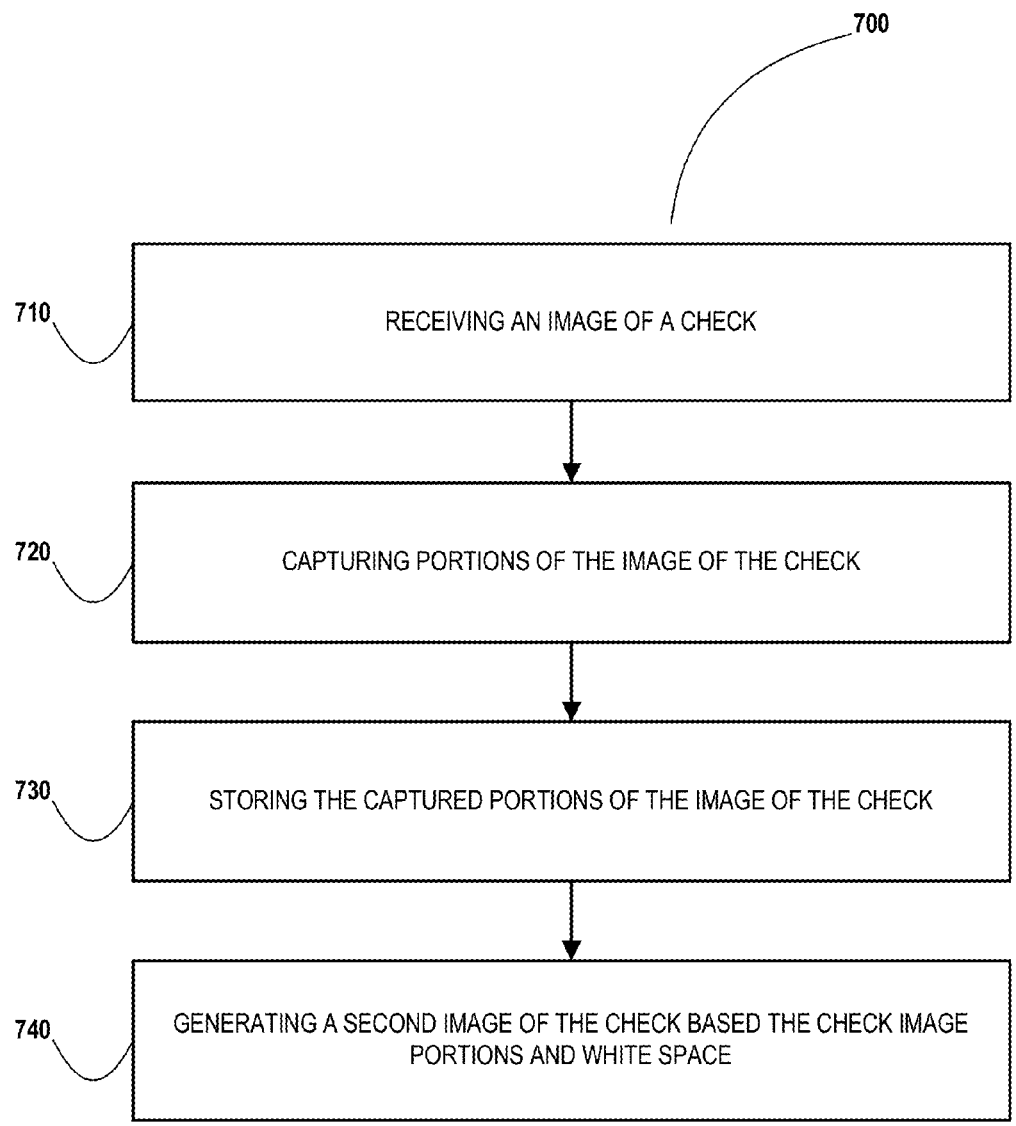

FIG. 7 illustrates an alternative more detailed process flow for image recreation using white space and images of check elements, in accordance with some embodiments of the present invention.

Figure 8:
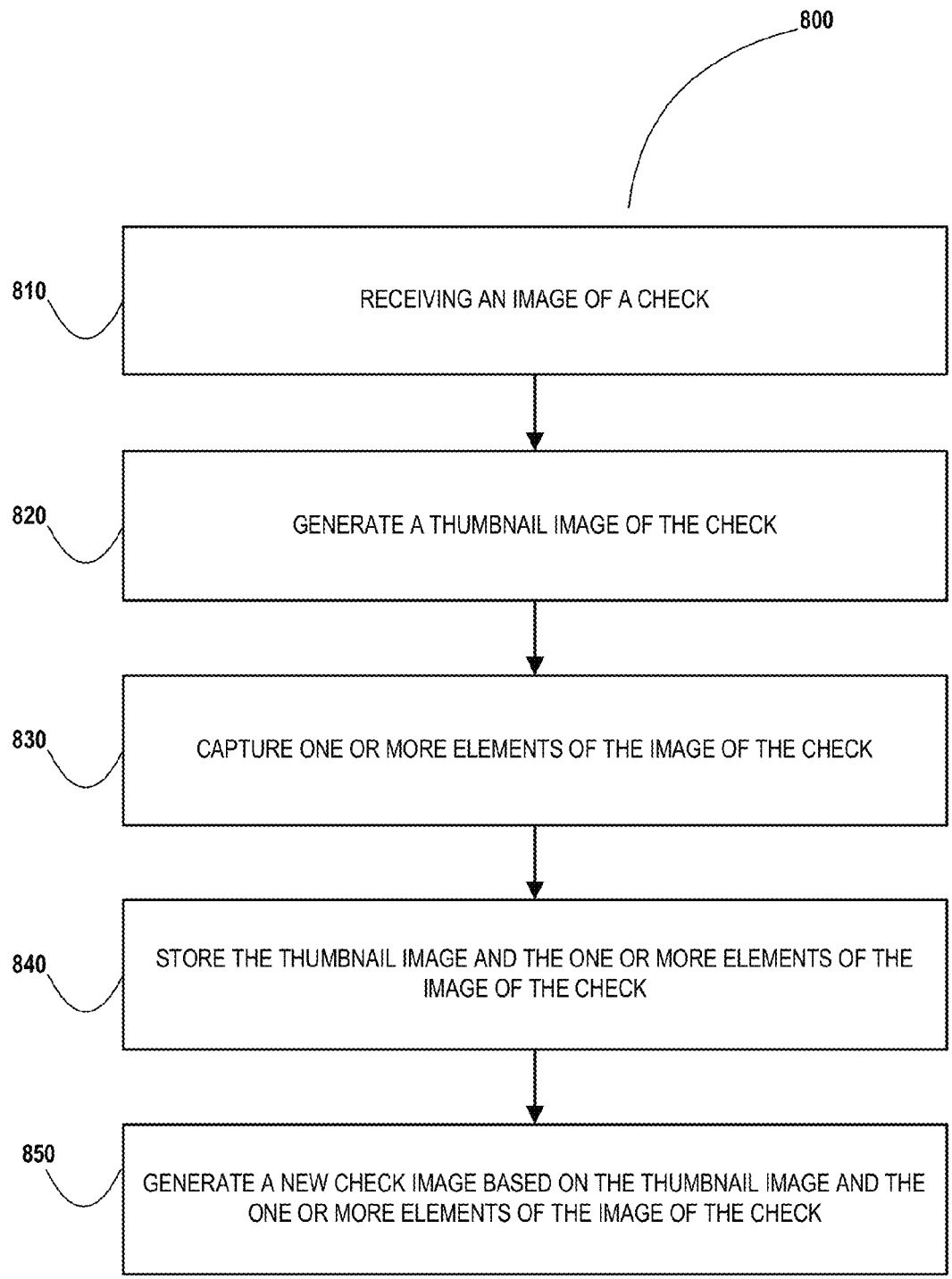

FIG. 8 illustrates a detailed process flow for storing a thumbnail image and elements of a check image for use in generating a check image, in accordance with some embodiments of the present invention.

DETAILED DESCRIPTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, and/or operational aspects of any of the embodiments described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout. Although the embodiments of the invention described herein are generally described as involving a "bank," one of ordinary skill in the art will appreciate that other embodiments of the invention may involve other financial institutions, or businesses outside of financial institutions, that utilize customer representatives, call centers, or other comparable systems.

Embodiments of the present invention relate to check imaging technology with a purpose of saving storage space in the archive associated with an entity (e.g., a financial institution). Currently, an entity's check imaging system may receive an image of a check at a high resolution (200 dots per inch (DPI)) and may store the image in the archive at this resolution for a mandated period of time, which may be years. In many instances, the mandated period of time is seven years for financial institutions. However, regulations may not require that the archived image be of this high resolution. To save storage space in the archive, the present invention may capture pieces of the check information by processing the image of the check and then storing the various pieces of the check information as either text or smaller high resolution (or low resolution) images. The pieces of check information may then be retrieved individually or in bulk by an apparatus to generate a second image of the check. Furthermore, the present invention may create a thumbnail version of the image of the check at a lower resolution and store said thumbnail version of the image of the check in the archive for seven years in lieu of storing the high resolution image of the check. A check is an example of a document that may be captured or processed in this invention. As used herein, a "check" may also refer to a myriad of financial documents including, but not limited to, a lease document, a mortgage document, a deposit slip, a payment coupon, a receipt, any negotiable instrument or the like. In some embodiments, the check may exist as a physical item printed on paper or other medium. In other embodiments, the check may exist electronically.

Referring now to FIG. 1, FIG. 1 presents a general process flow 100, in accordance with some embodiments of the invention. At block 110, the method comprises receiving an image of a check. In some embodiments, the image of the check may be received by an apparatus (e.g. a computer system) via a user's mobile device, a camera, an Automated Teller Machine (ATM) at one of the entity's facilities, a second apparatus at a teller's station, or the like. In other embodiments, the apparatus may be configured to capture the image of the check using a type of image capture device, such as a camera. An example of an apparatus that performs block 110 is the user input system 240 in FIG. 2.

At block 120, the method comprises processing the image of the check to collect check information. After the successful retrieval or capture of the image of the check, the apparatus may process the image of the check. The apparatus may capture individual pieces of check information from the image of the check. In some embodiments, the check information may be text. In other embodiments, the check information may be an image. Further processing enables the apparatus to create a thumbnail version (a resized smaller version) of the image of the check at a lower resolution. In some embodiments, the thumbnail version of the image of the check may be created substantially simultaneously to the capture of the image of the check. An example of the apparatus that performs block 120 is system 230 in FIG. 2.

At block 130, the method comprises storing the check information. After the image of the check is processed, the apparatus may store the collected check information. In some embodiments, the individual pieces of check information may be stored separately, and may be associated with each other via data or metadata. In some embodiments, the individual pieces of check information may be stored together. In some embodiments, the apparatus may additionally store the original image of the check immediately after the image of the check is received. Because the original high resolution image of the check must be held in storage for a 90 day period, the high resolution image of the check may be deleted 90 days (or any time thereafter) following its capture. In some embodiments, the apparatus may additionally store the thumbnail version of the image of the check. The entity may reserve the right to determine how to process and/or how long to store the check information, image of the check, and/or the thumbnail version of the check. An example of the apparatus that performs block 130 is system 230 in FIG. 2.

At block 140, the method comprises generating a second image of the check, based on the check information. If the user wishes to view the image of the check, the apparatus may generate a second image of the check based on the stored check information (text, images, or the like). In some embodiments, pieces of the check information may be requested individually. In these embodiments, pieces of the check information may be delivered individually based on the user's request. For example, if the user wishes to view just the check number, the apparatus may deliver to the user just the check number, not the entire image of the check. In other embodiments, multiple pieces of the check information may be retrieved. For example, if the user wishes to view an image of the entire check, the apparatus may retrieve multiple pieces of check information and produce for the user an image of the check. In some embodiments, the generated image of the check may accurately present the stored check information on a standard template (e.g. a check with a blank or plain background). The entity may reserve the right to determine the design or style of the template.

Referring now to FIG. 2, FIG. 2 presents an exemplary block diagram of the system environment 200 for implementing the process flow described in FIG. 1 in accordance with embodiments of the present invention. As illustrated, the system environment 200 includes a network 210, a system 230, and a user input system 240. Also shown in FIG. 2 is a user 245 of the user input system 240. The user input system 240 may be a mobile device described herein. The user 245 may be a person who uses the user input system 240 to execute a user application 247. The user application 247 may be an application to communicate with the system 230, perform a transaction, input information onto a user interface presented on the user input system 240, or the like. The user application 247 and/or the system application 237 may incorporate one or more parts of any process flow described herein.

As shown in FIG. 2, the system 230, and the user input system 240 are each operatively and selectively connected to the network 210, which may include one or more separate networks. In addition, the network 210 may include a telecommunication network, local area network (LAN), a wide area network (WAN), and/or a global area network (GAN), such as the Internet. It will also be understood that the network 210 may be secure and/or unsecure and may also include wireless and/or wireline and/or optical interconnection technology.

The user input system 240 may include any computerized apparatus that can be configured to perform any one or more of the functions of the user input system 240 described and/or contemplated herein. For example, the user 245 may use the user input system 240 to transmit and/or receive information or commands to and from the system 230. In some embodiments, for example, the user input system 240 may include a personal computer system, a mobile computing device, a personal digital assistant, a mobile phone, a tablet computing device, a network device, an ATM, a bank teller's equipment, and/or the like. As illustrated in FIG. 2, in accordance with some embodiments of the present invention, the user input system 240 includes a communication interface 242, a processor 244, a memory 246 having an user application 247 stored therein, and a user interface 249. In such embodiments, the communication interface 242 is operatively and selectively connected to the processor 244, which is operatively and selectively connected to the user interface 249 and the memory 246. In some embodiments, the user 245 may use the user application 247 to execute processes described with respect to the process flows described herein. Specifically, the user application 247 executes the process flow described in FIG. 1, as well as any other process flow described herein.

Each communication interface described herein, including the communication interface 242, generally includes hardware, and, in some instances, software, that enables the user input system 240, to transport, send, receive, and/or otherwise communicate information to and/or from the communication interface of one or more other systems on the network 210. For example, the communication interface 242 of the user input system 240 may include a wireless transceiver, modem, server, electrical connection, and/or other electronic device that operatively connects the user input system 240 to another system such as the system 230. The wireless transceiver may include a radio circuit to enable wireless transmission and reception of information. Additionally, the user input system 240 may include a positioning system. The positioning system (e.g., a global positing system GPS) may enable at least one of the user input system 240 or an external server or computing device in communication with the user input system 240 to determine the location (e.g., location coordinates) of the user input system 240.

Each processor described herein, including the processor 244, generally includes circuitry for implementing the audio, visual, and/or logic functions of the user input system 240. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 247 of the memory 246 of the user input system 240.

Each memory device described herein, including the memory 246 for storing the user application 247 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 2, the memory 246 includes the user application 247. In some embodiments, the user application 247 includes an interface for communicating with, navigating, controlling, configuring, and/or using the user input system 240. In some embodiments, the user application 247 includes computer-executable program code portions for instructing the processor 244 to perform one or more of the functions of the user application 247 described and/or contemplated herein. In some embodiments, the user application 247 may include and/or use one or more network and/or system communication protocols. In some embodiments, the user application 247 may be associated with a mobile device, wherein the mobile device executes a check deposit application. In some embodiments, the user application 247 may be associated with an ATM at one of the entity's facilities. Thus, the ATM may include a check imaging system wherein the check imaging system captures an image of the check. Following successful capture of the image of the check, the ATM may transmit the image to the system 230 for processing, storage, generation of an image of the check, or the like. In other embodiments, the user application 247 may interact with a bank teller, his equipment, a kiosk in the entity's facility, or the like associated with the entity.

Also shown in FIG. 2 is the user interface 249. In some embodiments, the user interface 249 includes one or more output devices, such as a display and/or speaker, for presenting information to the user 245. In some embodiments, the user interface 249 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 245. In some embodiments, the user interface 249 includes the input and display devices of a mobile device, which are operable to receive and display information.

FIG. 2 also illustrates a system 230, in accordance with an embodiment of the present invention. The system 230 may include any computerized apparatus that can be configured to perform any one or more of the functions of the system 230 described and/or contemplated herein. In accordance with some embodiments, for example, the system 230 may include a computer network, an engine, a platform, a server, a database system, a front end system, a back end system, a personal computer system, and/or the like. Therefore, the system 230 may be a server managed by the entity. The system 230 may be located at the facility associated with the entity or remotely from the facility associated with the entity. In some embodiments, such as the one illustrated in FIG. 2, the system 230 includes a communication interface 232, a processor 234, and a memory 236, which includes a system application 237 and a datastore 238 stored therein. As shown, the communication interface 232 is operatively and selectively connected to the processor 234, which is operatively and selectively connected to the memory 236.

It will be understood that the system application 237 may be configured to implement any one or more portions of the various user interfaces and/or process flow described herein. The system application 237 may interact with the user application 247. It will also be understood that, in some embodiments, the memory includes other applications. It will also be understood that, in some embodiments, the system application 237 is configured to communicate with the datastore 238, the user input system 240, or the like.

It will be further understood that, in some embodiments, the system application 237 includes computer-executable program code portions for instructing the processor 234 to perform any one or more of the functions of the system application 237 described and/or contemplated herein. In some embodiments, the system application 237 may include and/or use one or more network and/or system communication protocols. In some embodiments, the system application 237 may include the processing of the image of Check 1 300 from which the system 230 may collect check information.

In addition to the system application 237, the memory 236 also includes the datastore 238. As used herein, the datastore 238 may be one or more distinct and/or remote datastores. In some embodiments, the datastore 238 is not located within the system and is instead located remotely from the system. In some embodiments, the datastore 238 stores information or data described herein. For example, the datastore 238 may store information associated with the user's account, check information, or the like. Further, the datastore 238 may comprise an archive, temporary storage locations, or the like.

It will be understood that the datastore 238 may include any one or more storage devices, including, but not limited to, datastores, databases, and/or any of the other storage devices typically associated with a computer system. It will also be understood that the datastore 238 may store information in any known way, such as, for example, by using one or more computer codes and/or languages, alphanumeric character strings, data sets, figures, tables, charts, links, documents, and/or the like. Further, in some embodiments, the datastore 238 may include information associated with one or more applications, such as, for example, the system application 237. It will also be understood that, in some embodiments, the datastore 238 provides a substantially real-time representation of the information stored therein, so that, for example, when the processor 234 accesses the datastore 238, the information stored therein is current or substantially current. FIG. 4 expresses the datastore 238 and its contents in more detail.

FIG. 2 also shows two check images that interact with the system environment 200. The image of Check 1 300 may be the image of the check that is received by the user input system 240. The user input system 240 may collect the check information from the image of Check 1 300. The image of Check 2 500 may be the image of the check that is generated by the system 230. The image of Check 2 500 may be generated based on the check information stored in the datastore 238. Both images of Check 1 300 and Check 2 500 may include an image of the entire check, a thumbnail version of the image of the check, individual pieces of check information, or the like.

It will be understood that the embodiment of the system environment illustrated in FIG. 2 is exemplary and that other embodiments may vary. As another example, in some embodiments, the system 230 includes more, less, or different components. As another example, in some embodiments, some or all of the portions of the system environment 200 may be combined into a single portion. Likewise, in some embodiments, some or all of the portions of the system 230 may be separated into two or more distinct portions.

In addition, the various portions of the system environment 200 may be maintained for and/or by the same or separate parties. It will also be understood that the system 230 may include and/or implement any embodiment of the present invention described and/or contemplated herein. For example, in some embodiments, the system 230 is configured to implement any one or more of the embodiments of the process flows described and/or contemplated herein in connection any process flow described herein. Additionally, the system 230 or the user input system 240 is configured to initiate presentation of any of the user interfaces described herein. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. As used herein, an apparatus may refer to at least one of the user input system 240 or the system 230.

Now referring to FIG. 3, FIG. 3 illustrates an exemplary image of Check 1 300, the image of the check received by the user input system 240. The image of Check 1 300 may comprise an image of the entire check, a thumbnail version of the image of the check, individual pieces of check information, or the like. Check 1 300 comprises check information, wherein the check information comprises contact information 305, the payee 310, the memo description 315, the account number and routing number 320 associated with the appropriate user or customer account, the date 325, the check number 330, the amount of the check 335, the signature 340, or the like. In some embodiments, the check information may comprise text. In other embodiments, the check information may comprise an image. The user input system 240 may capture an image of Check 1 300 and transmit the image to the system 230 via a network. The system 230 may collect the check information from the image of Check 1 300 and store the check information in the datastore 238. In some embodiments, the pieces of check information may be stored in the datastore 238 individually. In other embodiments, multiple pieces of check information may be stored in the datastore 238 together. In some embodiments, the pieces of check information may be stored in the datastore 238 immediately following the capture of the image of Check 1 300. In other embodiments, the pieces of check information may be stored in the datastore 238 at a predetermined point in time after the image of Check 1 300 has been captured. The entity may reserve the right to determine the point in time in which the check information is stored in the datastore 238. In some embodiments, the check information may be captured or stored in the datastore 238 at a lower resolution than the original image of the check. In other embodiments, the check information may be captured or stored in the datastore 238 at a higher resolution than the original image of the check. In some embodiments, the check information may be captured or stored in the datastore 238 at a reduced size. In other embodiments, the check information may be captured or stored in the datastore 238 at an increased size.

Now referring to FIG. 4, FIG. 4 illustrates an example of the datastore 238. The system 230 may store the pieces of check information of the processed check in one or more datastores 238. In some embodiments, a datastore 238 may comprise at least one element of check information for multiple checks. For example, a datastore 238 may include check numbers (or payee names, check amounts, check dates, signatures, or the like) for multiple checks. In other embodiments, multiple checks may share a single datastore 238 for the storage of their check information. Items 410, 420, 430, and 440 represent categories of check information in the datastore 238. For example, categories of check information may include but are not limited to the check number, the payee, the amount of the check, the memo description, the contact information, the date, the signature, the account number and routing number, or the like. Further, associated pieces of check information for a single check may be linked with one another using data or metadata. For example, check number 0001 and payee name 0001 may be associated with each other for ease of access.

Referring now to FIG. 5, FIG. 5 illustrates the image of Check 2 500. The image of Check 2 500 comprises an image of the entire check, a thumbnail version of the image of the check, individual pieces of check information, or the like. The system 230 may retrieve the pieces of check information to generate a new image of Check 2 500. In some embodiments, the retrieved pieces of check information may be presented in the image of Check 2 500 at a lower resolution than the original image of the check. In other embodiments, the check information may be presented in the image of Check 2 500 at a higher resolution than the original image of the check. In some embodiments, the check information may be presented in the image of Check 2 500 at a reduced size. In other embodiments, the check information may be presented in the image of Check 2 500 at an increased size. Check 2 500 may comprise check information, wherein the check information may comprise contact information 505, the payee 510, the memo description 515, the account number and routing number 520 associated with the appropriate user or customer account, the date 525, the check number 530, the amount of the check 535, the signature 540, or the like.

Check Imaging Bifurcation/Separation

Embodiments of the present invention relate to methods and systems for capturing in one or more images the content or information represented on a negotiable instrument, such as a check and storing those images. Images of portions or individual pieces of the check without content or information are also captured and stored, albeit in some instances a different format having a lesser image quality. For example, in some embodiments of the present invention, a user will deposit a check into an automated teller machine (ATM), the ATM, using this invention, will capture images of the portions of the check that have information relating to the amount of the check, the names of the payor/payee, date of the check, MICR of the check, or in some instances, some of the design elements of the check. Thus producing several smaller images of only the portions of the check having relevant information. The system or ATM will then designate the remaining portions of the check not having content or information as white space elements. Accordingly, these white space portions of the check may include any area of the check without written, textual, visual, numerical, or coded data that is used in some manner to indicate information on a check. The portions of the check that the ATM determines does not have content or information are also imaged and stored as white space or in a format with lesser image quality and/or a format that would generally result in an image file with a smaller data footprint. Thus, at least, one advantage of the present invention is that it allows a bank or other financial institution that receives checks or any negotiable instruments for deposit and the like to capture, as high quality images, only those elements of the check that are important for processing or potentially necessary recreating the check and capturing, as low quality images, the remaining elements of the check that are not vital for either processing or recreating the check. As a result, this invention saves on the amount of storage space required to store the images from a check.

Referring now to FIG. 6, a more detailed process flow 600 diagram is provided for image recreation using white space and check element capture, in accordance with an embodiment of the present invention. In some embodiments, the process flow 600 is performed, in combination, by a mobile device (i.e., one or more mobile devices) and an ATM (i.e., one or more ATMs), where each has hardware and/or software configured to performed one or more portions of the process flows 600 and 700. It will be understood that, in some embodiments, a single ATM or a single mobile is configured to perform all of the steps of process flow 600 or any other process flow or feature of the invention described herein. In such embodiments, as represented by block 610, a system using process flow 600 receives a negotiable instrument (e.g., a check). As represented by block 620, the system executing process flow 600 captures images of the check. As represented by block 630, the system executing process flow 600 stores the captured images of the check. As represented by block 640, the system executing process flow 600 generates a second check image based at least partially on the check images and check information.

Regarding block 610, the system executing process flow 600 is an ATM. In such an embodiment, the ATM is configured to receive one or more negotiable instruments. As an example, a user who wants to deposit a combination of a payroll check and several personal checks may approach the ATM machine and deliver to some receiving portion of the ATM the physical check documents. At which time, the ATM machine would receive the check documents from the user. In some embodiments, the system executing process flow 600 is a mobile device (e.g., a mobile phone, a smart phone, and the like), where the mobile device receives the one or more physical check documents. In such an instance, the mobile device receives the physical check documents by capturing images of the check documents. Alternatively, the mobile device may also receive the check documents via a short-range wireless non-contact system that uses radio-frequency electromagnetic fields, wireless internet, Bluetooth, or any other short-range technologies for transferring the data from the checks to a storage device associated with the mobile device. For example, a user using a mobile device may receive a check by communicating with an RFID chip located in some portion of a check that communicates all of the details and features of the check. Similarly, a user using a mobile device may receive a check by communicating with another mobile device with the check information thereon.

Still regarding block 610, the system executing process flow 600 receives a check electronically. In such an embodiment, the system electronically receives an image of a check. In some embodiments, the system electronically receives check information from a physical or electronic check. An embodiment of the invention for receiving a check is described above in connection with a mobile device. In some an alternative embodiments, the systems executing process flow 600 are a mobile device in combination with an ATM. In such an embodiment, a user of a mobile device may be able to communicate electronically over wireless internet or wireline communication. The mobile device, in such an instance, may have a check stored in a storage device associated with the mobile device (e.g., memory device of the mobile device). The mobile device, in some embodiments, can electronically transfer the information related to the check directly to the ATM machine for deposit, using wireless or wireline technology. For example, a user may have a check stored on the memory of his mobile device that he wants to deposit. In such an example, the user may approach an ATM or remotely access an ATM in order to electronically send the check to the ATM. In such an instance, the ATM would receive the check upon the completion of the transfer of the check information from the mobile device. It will be understood that the electronic transfer of check information can occur with any combination of systems or by one computing system, alone.

Regarding block 620, the system executing process flow 600 is an ATM. In such an instance, the ATM, using a capture device, is configured to capture images of the check. The capture device may be any device capable of capturing an image, including but not limited, to a camera, a digital camera, fax machine, digital scanner, and the like. The capture device may be configured to capture, as images, elements of the check. In some embodiments, the system may first use a processing device to bifurcate the check into at least two different types of elements. The bifurcation process may be done electronically, where the ATM first places a digital overlay over the areas of the check, where the digital overlay comprises portions of the check with content or useful information enclosed with some type of perimeter and the other portions of the check are not enclosed in a perimeter. Alternatively, the system may differentiate the portions of the check without content or useful information by creating a pattern on the overlay surrounding the perimeters enclosing the portions of the check with content or useful information. Further alternatively, the pattern on the overlay for distinguishing areas without content or useful information may be placed on the overlay of the check such that it forms the perimeters surrounding the content or useful information on the check, without having to separately create a perimeter around the content or useful information on the check. The perimeters surrounding the content or useful information on the checks may be in any shape, form, or size (e.g., circular, rectangular, non-circular, or non-rectangular, odd shaped, and the like). Once the system bifurcates the portions of the check into, at least, these two elements the ATM may then capture the images of each type of element separately. Alternatively, the system executing process flow 600 may capture each element separately, irrespective, of whether the element is of a useful information-type or a non-useful information-type of element. In such an embodiment, the system may separate the elements based on whether it is of a useful information-type or a non-useful information-type and store them as such. For clarification, in some embodiments, once the system bifurcates and/or differentiates the check elements types, the system extracts these elements from a check image and proceeds to store the check image elements separately, according to check image type. It will be understood that although the term bifurcate is used to describe the process of differentiating useful check elements and non-useful elements for check image capture, the term, in some instances, should not be limited to differentiating or the splitting/separation of just two elements but the differentiating process may be of more than two elements. As an example, the system may bifurcate using the overlay system a check into three elements including handwritten/user inputted portions, standard check elements portion (e.g., MICR number, user name/address information, pay to line, and the like), and a non-useful information portion (e.g., parts of the check without information, text, or content, and the like). In some embodiments, the standard check elements portions and the non-useful information portions may be combined. For clarification, useful check elements may include, but is not limited to, any of the handwritten portions of the check, any information inputted on the check by the payor or payee of the check, pre-existing check elements that relate to standard features or information on a check (e.g., Name and address of the account holder associated with the check, check number, a labeled or designated portion for inserting a date (e.g., "Date _____"), Payee section (e.g., "Pay to the Order of" section), check amount box (e.g., "$ _____"), check amount line (e.g., check portion for handwriting the check amount), a memo portion for indicating the purpose of the check (e.g., "Memo _____"), a signature line portion for endorsing the check instrument, a routing and/or transit number portion, an account number portion, any other elements on a check that contains information for identifying the check, and the like.). For further clarification, the non-useful check elements may include, but is not limited to, any elements of a check without written or numerical information, any elements of the check without coded information (e.g., watermarks, MICR, and the like), the background of the check, the design elements of the check, and the like.

Further regarding block 620, in some embodiments, the system is configured to reduce or remove the non-data elements from the check image and store the remaining elements of the check image as data elements. These remaining data elements may be stored together and/or separately. When the data elements are stored separately, the system is configured to tag the elements with metadata that relates the elements to each other using various forms of information relating to the check, transaction involving the check, and/or account associated with the check. For example, in some embodiments, when images of the payee name and images of the check amount are stored separately, the system may relate or tie together the images by tagging or appending to the check images a transaction identifier such that a person who identifies a certain transaction identifier can easily retrieve the check elements associated with the transaction. The process involving the reduction or removal of non-data elements may also be referred to herein as "white-space reduction" because the system is configured to determine the white space elements of the check and eliminate or substantially reduce those portions of the check image so that only the remaining non-white and data having portions of the check can be stored.

In some embodiments, the system is configured to capture data elements from a check image using heuristics. The heuristics may be related to experience-based learning by the system of the location, type of check elements, and availability of data elements on a check image. The heuristics are used as a short cut for determining which elements or data elements on a check that should be capture and eventually stored for check recreation. The heuristics may be embodied in rules that are applied by the system for determining the approximate location and determining which of the data elements of a check that should be captured. The system, in some embodiments, is configured to use heuristics in addition to any other technique described herein to process quickly the data and non-data elements of a check.

In yet another embodiment, the system uses the magnetic ink character recognition (MICR) to determine the position of non-data and data elements on a check image. For example, the MICR of a check may indicate to the system that the received or captured check image is a business check with certain dimensions and also, detailing the location of data elements, such as the check amount box or Payee line. In such an instance, once the positions of this information is made available to the system, the system will know to capture any data elements to the right or to the left of the identified locations or include the identified data element in the capture. This system may choose to capture the data elements of a check in any manner using the information determined from the MICR number of the check.

Now regarding block 630, once the system executing process flow 600 has bifurcated the check image elements into, at least, two check image element types, a first check image element type being of the useful check element-type and the second check image element type being of the non-useful check image element type, the system stores the check image element types in a storage device and/or archive. In such an embodiment, the system executing process flow 600 may be a bank server. In some embodiments, the bank server stores the images of the check comprising useful check information in a higher image quality than the images of the check comprising non-useful check information. For example, the bank server may capture as useful check images the check amount, payee name, and MICR of a check and may capture as non-useful check images the background of the check which does not contain any information used in check processing and settlement. The bank server will then store in an archive the useful check images including the check amount, payee name, and MICR in a high image resolution (e.g., high DPI, high pixels, and the like) and alternatively, save the non-useful check images of the background of the check in a low image resolution (e.g., low DPI, low pixels, and the like). Thus, the results of saving the useful and non-useful check images in this manner are that the useful check images used in processing and the settlement of the check are stored with more detail and having a larger data footprint, whereas the non-useful check images containing information not used in check processing and settlement are stored with less detail and having a smaller data footprint. In some embodiments, the useful check images in high image resolution and the non-useful check images in low resolution are stored in the same location. In other embodiments, the useful check images in high image resolution and the non-useful check images in low resolution are stored in different locations. In some embodiments, each of the check images of the useful and non-useful type are appended or tagged with meta data or other information indicating the check image type, image resolution information, various information identifying the check image, and/or the like. Such that a processing system easily process, store, associate the check images, and/or retrieve the check image information for later use.

In some embodiments, the system is configured to store the useful data elements of a check in differing resolutions based on the relative significance or importance of the data element. For example, in some embodiments, the system may capture for storage data elements from a check including the check date, the signature, and the check amount. In such an example, of these captured data elements the check amount is relatively more significant than the check data and check amount elements and thus stored at a higher resolution. It will be understood that the relative significance of the capture data elements of a check may vary and as such, the system may determine the relative significance of certain elements based on rules relating to the hierarchical significance of data elements of a check.

Regarding block 640, the system executing process flow 600 generates a second check image based at least partially on the check images and check information. In such an embodiment, the system executing process flow 600 may be a combination of a financial institution server and a user computer referred to herein as a check image generation system. Upon receiving a request from a user regarding the retrieval a check, the check image generation system searches the archives for check images and check information associated with the check in the user request. In some embodiments, the user is a customer, using an online banking interface banking application on a customer terminal or computing device useable for displaying the resulting second check image. The check generation system then generates a check image using the useful check image elements and the non-useful check image elements, such that the resulting check image comprising, at least, check image elements with a first resolution (e.g., high resolution) and check image elements with a second resolution (e.g., low resolution). More particularly, in some embodiments, the check generation system generates a check image by integrating the useful check image elements and a version of the non-useful check image elements into one new check image.

Referring now to FIG. 7, an alternative more detailed process flow 700 is provided for image recreation using white space and check element capture, in accordance with an embodiment of the present invention. As represented by block 710, a system executing process flow 700 receives an image of a check. As represented by block 720, the system executing process flow 700 captures portions of the image of the check. As represented by block 730, the system executing process flow 700 stores the captured portions of the image of the check. As represented by block 740, the system executing process flow 700 generates a new check image using white space and check image portions captured from the image of the check.

Regarding block 710, block 710 of process flow 700 is substantially similar to block 610 of process flow 600, but in block 710 the system executing the process flow 700 receives an image of a check for initial process of check information, whereas in block 610 the system is receiving a physical check for processing.

Regarding block 720, the system executing process flow 700 captures portions of the image of the check by separating the portions and/or elements of the image of the check into quadrants. As referred to herein, the term quadrant is used broadly to describe the process of differentiating elements of a check image by separating portions and/or elements of the image of the check into sectors. These sectors may be identified using a two-dimensional coordinate system or any other system that can be used for determining the location of the sectors. In many instances, each sector will be rectangular in shape. In some embodiments, the system identifies each portion of the image of the check using a plurality of quadrants. In such an embodiment, the system may further analyze each quadrant using character and/or data recognition software in order to determine whether each quadrant has valuable or useful information. Generally, valuable or useful information may relate to any data or information that may be used for processing and/or settlement of the check, used for identifying the check, and the like. Once the system determines the quadrants of the image of the check having valuable and/or useful information, the system can extract the identified quadrants together with the information from the image of the check for storage. The quadrants may be extracted in the form of an image of the contents of the quadrant, as text representing the contents of the quadrant, as code representing the contents of the quadrant, and the like. In some embodiments, the quadrants of the image of the check that are not identified as having valuable and/or useful information are not extracted from the image. It will be understood that quadrants may be used to capture images of portions of a physical check, as well as from an image of a check.

Still regarding block 720, in some embodiments, the system determines the valuable and/or useful elements of the check image and applies quadrants to only those elements of the check image. In this way, the system can readily identify which elements of the image of the check to capture, as images, and which elements of the check that should be stored as white space.

Yet still regarding block 720, in some embodiments, the system uses a grid system to identify non-data and data elements of a check image. The grid system may be similar to the quadrant system. Using the grid system, the system identifies the position of each grid element using a coordinate system (e.g., x and y coordinates or x, y, and z coordinate system or the like) or similar system for identifying the spatial location of a grid element on a check. In practice, the spatial location of a grid element may be appended to or some manner related to grid elements with check data. For example, using the grid, the system may identify which grid elements of the grid contain data elements, such as check amount and payee name, and either at the time of image capture or extraction of the check image within the grid, the system can tag the grid element having the check data element with the grid element's spatial location. As such, upon recreation of the check, the system can easily determine the location to place the data element on the recreated check image.

Yet still in some embodiments, the may capture data elements from a check or check image using a pixel differentiation technique. For example, in combination with the grid technique, the system may analyze the image within the grid in order to determine if a data element exists within that grid by determining whether there is substantial pixel differentiation between portions of the image within the grid. In such an instance, if the image within the grid is just of one color with substantially similar pixels, the system will indicate that there is no data in the grid and will therefore, not capture the image within the grid for storage. In the instances, where there is substantial pixel differentiation the system may indicate that there is at least one data element within the grid and subsequently capture the data element for additional analysis and/or storage. Character recognition, pattern recognition, design recognition, and/or any other type of data recognition software may be used to determine data elements on a check.

In some embodiments, the system may only capture certain data elements and not all data elements on the check based on experience-based learning. The system, in some embodiments, may only capture elements of a check it does not already have in its database. For example, in some embodiments, the system processes multiple checks for one customer and in such an example, the system may have already stored an image of the address information of the consumer. Therefore, in such instances, the system avoid capturing an image of the address data element of the check image for storage but instead, tag/append data or metadata to the check information that points to a previously stored image of the consumer's address information. Thus, upon recreation of the check, the system may reference a data table that either includes the previously stored address information or further directs the system to the previously stored data element of the check.

In some embodiments, the system maps the positions of the data elements of the check for image capture. Using this mapping technique, the system may identify all the data elements of the check on a diagram or a plurality of diagrams, where the diagram(s) show the position of each data element on the check. This mapping technique can be used alone or in combination in the recreation of a check image that includes images of the data elements or check element images from the original check.

Regarding block 730, in some embodiments, the system executing process flow 700 stores the quadrants with valuable and/or useful information, as images, and stores the quadrant not having valuable and/or useful information, as white space. In such an embodiment, the quadrants stored as images are stored with a higher image quality and/or resolution than the quadrants saved as white space. In this way, the only the important quadrants are saved with high image quality and/or resolution in order to reduce the amount of storage space required for saving check information.

Regarding block 740, in an embodiment of the invention, upon request by a user, the system executing process flow 700 generates a check image based at least partially on the quadrants with valuable and/or useful check information. Based on the request, the system locates check information related to the request, the check information including the quadrants of valuable and/or useful information stored, as images, and the other quadrants, stored as white space. Upon locating this information the system integrates the quadrants having the valuable or useful information and the quadrants stored as white space to form a new check image that is substantially similar to the original/standard image of the check from which the quadrants of check images and information derive. As a result, the user is presented with a check image that resembles the original check deposited or provided to the system.

Thumbnail Check Images

In general terms, some embodiments of the present invention relate to methods, systems, apparatuses, and computer program products for creating a thumbnail of a check image and capturing elements of the check image such that the thumbnail of the check image together with the capture elements of a check may be used in recreating a standard size image of the check. The thumbnail of the check image, in some embodiments, is a small graphics file created from a standard/normal size image of a check or simply stated, the thumbnail of the check image is a smaller image and version of the standard image of the check. Accordingly, the thumbnail is a smaller electronic file than the electronic file of the standard check image. As an example, in some embodiments of the present invention, a user will deposit a check into an automated teller machine (ATM) or any other banking system, the ATM, using the invention captures the image of the check, in real-time or substantially real-time, and also creates a thumbnail of the captured check image. In addition, the ATM will capture, in a normal size, important elements of the check necessary for the processing and settlement of the check, such as the payee name, check routing and account number, check amount, check number, check date, the handwritten or inputted check amount, and the like. At a later time, following the deposit, the user may request a copy or image of the deposited check. The system using the present invention, may then generate a standard size image of a check by enlarging the thumbnail image of the original check image and optionally, enhancing the portions of the enlarged thumbnail image of the original check with the standard sized check elements captured from the original check image. Thus, at least, two advantages of the present invention include protecting against misappropriation of check information by allowing for customer verification and a reduction in the amount of storage space necessary for saving check images.

Referring now to FIG. 8, a general process flow 800 is provided for storing a thumbnail and elements of a check image for use in generating a another check image. In some embodiments, process flow 800 is performed, in combination, by a bank system, such as an ATM, and a bank or customer computing terminal, where each has hardware and/or software configured to perform one or more portions of the process flows 800 and 900. It will be understood that, in some embodiments, a single bank system or customer computing terminal is configured to perform all of the steps of process flows 800 and 900 or any other process flow or feature of the invention described herein. As represented by block 810, a system executing process flow 800, receives a physical check. In an alternative embodiment, the system receives an image of a check. As represented by block 820, the system executing process flow 800 generates a thumbnail image of the check. As represented by block 830, the system executing process flow 800 captures, as images, one or more elements of the check. As represented by block 840, the system executing process flow 800 stores the thumbnail image of the check and the images of the one or more elements of the check. As represented by block 850, the system executing process flow 800 generates a new image of a check using images of the one or more elements of the check and based at least partially on the thumbnail image of the original check.

Regarding block 810, the system executing process flow 800 is an ATM. In such an embodiment, the ATM is configured to receive one or more negotiable instruments or checks. As an example, a user who may want to deposit a payroll check may approach the ATM machine and deliver to some receiving portion of the ATM the physical payroll check document. At which time, the ATM machine would receive the check document from the user. In some embodiments, the system executing process flow 800 is a mobile device (e.g., a mobile phone, a smart phone, and the like), where the mobile device receives the payroll check document. In such an instance, the mobile device receives the physical check document by, using a capture device (e.g., a camera, video recorder, and the like), to capture one or more images of the payroll check document.

Still regarding block 810, the system executing process flow 800 receives a check electronically. In such an embodiment, the system electronically receives an image of a check. In some embodiments, the system electronically receives check information from a physical or electronic check.

Regarding block 820, in some embodiments, the standard/original image of the check, as received, is de-enhanced such that the resulting image is, at least, one of a smaller size than the original/standard check image, has a reduce graphic file size than the original/standard image of the check, and/or has a reduced image quality and/or resolution that the original/standard image of the check. Thus, a thumbnail image of the check generated by the system may have a smaller file size original check image, as received, and also has a reduced image quality than the check or check image. Thus, the thumbnail of the image of the check also has a reduced graphic file size. For example, the standard image of the check as captured may have physical dimensions of 2.5 inches in height by 6 inches in width and a 200 DPI resolution and a graphic file size of 500 kilobytes. In such an example, the thumbnail of the image generated from the standard image of the check may result in a check image with measured dimensions of 0.625 inches in height by 1.5 inches in width, a 40 DPI, and a graphic file size of 100 kilobytes. As can be gleaned from the example, the thumbnail of the image is physically smaller, of a lesser quality, and has a file size smaller than the original image of the check, as received. In some embodiments, the system is configured to generate a thumbnail image of the standard image of the check, as received, which is exactly proportional to the original physical/measured size, DPI resolution, and/or graphic file size of the image of the check. Thus, the system can be configured such that the thumbnail image of the check is a size that is a factor of the original size. For example, the system may be set to thumbnail factor of 3 indicating that the generated thumbnail image of the check should be three times smaller in dimensions, DPI, and/or file size. In another example, the system may be set to a thumbnail factor of ⅓ such that when a thumbnail image of a check is created the thumbnail image has dimensions, DPI resolution, and/or a file size that is ⅓ of the dimensions, DPI resolution, and/or file size of the original/standard size image of the check. It will be understood that the factor settings can be any type of settings, so long as the type of setting proportionally affects a size, dimension, and/or feature thumbnail image of a check when compared to the original/standard size of the check image. It will further be understood that the thumbnail image does not have to be proportionally reduced in all features, dimensions, or proportionally reduced at all when compared to the original/standard size of the check image. It will be understood that the measure of image quality may be any measure including, but not limited to, DPI, pixels, samples per inch, lines per inch, metric typography units, display resolution, mouse dpi, twip, and the like.

Still regarding block 820, the system executing process flow generates a thumbnail image of the check substantially contemporaneous with the generation of the standard/original image of the check. Thus, in some embodiments, the thumbnail image is generated in real-time or substantially real-time, as the check image is captured, or some time immediately thereafter. In some embodiments, the thumbnail image of the check is generated from the original/standard size image of the check. In other embodiments, the thumbnail image is generated from a separate image of the check.

Regarding block 830, in some embodiments, because the original image of the check is de-enhanced/un-enhanced in order to create a thumbnail image of the check, once the thumbnail is enlarged to a standard check image size, some of the features and elements of the check are of a reduced and sometimes a substantially reduced image quality. Thus, in some embodiments, when generating a new check image from the thumbnail image of a check, the enlarged thumbnail image of the check must be enhanced with original/standard size images of elements of the check such that a user who requests the check can clearly distinguish the important elements of the check. As described in block 830, these important elements of the check are captured as one or more images and, in some embodiments, texts, from the original check or original/standard size image of the check. These important elements of the check generally include check information relating to features and elements of the check necessary for the processing of the check and/or required for check settlement, such as, but not limited to, payee name, check amount, routing and account numbers, check date, handwritten/inputted check amount, and the like. The important check elements are captured in such a way that only the textual or content information of the elements and potentially some of the areas immediately surrounding the important elements of the check are in an image.

Further regarding block 830, the system executing process flow 800 is an ATM. In such an instance, the ATM, using a capture device, is configured to capture images of the check. The capture device may be any device capable of capturing an image, including but not limited, to a camera, a digital camera, video camera, fax machine, digital scanner, and the like. The capture device may be configured to capture, as images, elements of the check. In some embodiments, the system may first use a processing device to bifurcate the check into at least two different types of elements. The bifurcation process may be done electronically, where the ATM first places a digital overlay over the areas of the check, where the digital overlay comprises portions of the check with content or useful information enclosed with a type of perimeter and the other portions of the check are not enclosed in a perimeter. Alternatively, the system may differentiate the portions of the check without content or useful information by creating a pattern on the overlay surrounding the perimeters enclosing the portions of the check with content or useful information. Further alternatively, the pattern on the overlay for distinguishing areas without content or useful information may be placed on the overlay of the check such that it forms the perimeters surrounding the content or useful information on the check, without having to separately create a perimeter around the content or useful information on the check. The perimeters surrounding the content or useful information on the checks may be in any shape, form, or size (e.g., circular, rectangular, non-circular, or non-rectangular, odd shaped, and the like). Once the system bifurcates the portions of the check into, at least, these two elements the ATM may then capture the images of each type of check element separately. Alternatively, the system executing process flow 800 may capture each element separately, irrespective, of whether the element is of a useful information-type or a non-useful information-type of element. In such an embodiment, the system may separate the elements based on whether it is of a useful information-type or a non-useful information-type and store them as such. As an example, the system may bifurcate using the overlay system a check into three elements including handwritten/user inputted portions, standard check elements portion (e.g., MICR number, user name/address information, pay to line, and the like), and a non-useful information portion (e.g., parts of the check without information, text, or content, and the like). For clarification, useful check elements may include, but is not limited to, any of the handwritten portions of the check, any information inputted on the check by the payor or payee of the check, pre-existing check elements that relate to standard features or information on a check (e.g., Name and address of the account holder associated with the check, check number, a labeled or designated portion for inserting a date (e.g., "Date _____"), Payee section (e.g., "Pay to the Order of" section), check amount box (e.g., "$ _____"), check amount line (e.g., check portion for handwriting the check amount), a memo portion for indicating the purpose of the check (e.g., "Memo _____"), a signature line portion for endorsing the check instrument, a routing and/or transit number portion, an account number portion, any other elements on a check that contains information for identifying the check, and the like.). For further clarification, the non-useful check elements may include, but is not limited to, any elements of a check without written or numerical information, any elements of the check without coded information (e.g., watermarks, MICR, and the like), the background of the check, the design elements of the check, and the like.

Regarding block 840, the system executing process flow 800, in some embodiments stores a thumbnail image of a check separately from the captured images of the one or more check elements of a standard check image. In such an embodiment, the system associates the thumbnail image of the check and the one or more check elements by appending meta data to either of the thumbnail image or, at least, one of the images of the one or more check elements, wherein the meta data relates the thumbnail and the one or more check elements to each other for retrieval from a database. For example, the system may append to an image of a check amount (e.g., $5.00) an account number, a check number, and the storage location of all other check elements and thumbnail image of the standard check image such that a user searching for a check may query or search a database for a check by entering an account number and/or check number and the results of the search is one or more thumbnail images of checks and images of the one or more check elements, respectively, corresponding to each of the one or more thumbnail images of the checks. Yet, in other embodiments, the system stores the thumbnail image of a check and the associated one or more images of check elements together.

In some embodiments, the system stores the thumbnail image of a check in a different file format than the captured images of the one or more check elements of a standard check image, wherein the thumbnail image is stored in a file format resulting in an image of a lesser quality and/or file size than the captured images of the one or more check elements of the check image.

Regarding block 850, in some embodiments, upon request by a user, the system executing process flow 850 generates a substantial recreation of an original check image using a thumbnail image of the original check image and images of one or more elements of the original check image. In such an embodiment, the system enhances the thumbnail image of the original check image by enlarging the thumbnail image of the check image to substantially similar dimensions (e.g., height, width, and the like) of the original check image. In addition, in some embodiments, the system further enhances the enlarged thumbnail image of the check image by integrating or adding to the enlarged thumbnail image the associated images of the one or more check elements of the original check. In this way, although various portions of the enlarged thumbnail of the check may not have, as high quality and/or image resolution similar to the original check image, by adding the images of the one or more check elements a user should readily be able to verify the useful/significant elements of the check. This is also because the images of the one or more check elements of the original check image are not altered from the image quality and/or resolution of the original check image. Thus, the images of the one or more check elements of the original check will have the same appearance as if they were on the original check image. The image resulting from the enhanced thumbnail image of the check image is a new image different from the original/standard image of the check that may have been captured at the time of deposit or receipt by a system or device associated with a financial institution.

In some embodiments, one or more of the portions of the process flows represented by blocks, 610-640, 710-740, and 810-850 are triggered by one or more triggering events, which, in some embodiments, include the performance of one or more of the other portions of the process flow represented by blocks 610-640, 710-740, and 810-850. Also, in some embodiments, the system executing process flows 600, 700, or 800 are configured to perform one or more portions (or combinations of portions) of the process flows represented by blocks 610-640, 710-740, and 810-850, from start to finish, within moments, seconds, and/or minutes.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

The invention claimed is:

1. A system for capturing and storing elements of a negotiable instrument for use in image recreation, the system comprising:
   an image capture device;
   a database;
   a processing device in communication with the capture device and the database, wherein the processing device is used to:
      receive an image of the negotiable instrument, wherein the image of the negotiable instrument comprises one or more elements that are used for processing the negotiable instrument and non-element portions that are not used in processing the negotiable instrument;
      capture, using the image capture device, images for each of the one or more elements of the negotiable instrument, wherein the images comprise at least a payor signature image, an amount image, and a payor information image;
      alter the resolution of at least the payor signature image and the amount image to a first resolution;
      alter the resolution of at least the payor information image to a second resolution, wherein the second resolution is lower than the first resolution;
      alter the resolution of the non-element portions of the image of the negotiable instrument to a third resolution, wherein the third resolution is lower than the second resolution;
      store the images of the one or more elements of the negotiable instrument in the database;
      store, as white space, the non-element portions of the image of the negotiable instrument in the database;
      receive a request from a user to retrieve information associated with the negotiable instrument, wherein the information comprises a user selection of one or more specific elements associated with the negotiable instrument;
      retrieve from the database, the one or more specific elements selected by the user based on at least the received request; and
      generate a partial image of the negotiable instrument based on at least the one or more retrieved specific elements selected by the user.

2. The system of claim 1, wherein the processing device is further configured to:
　generate a second image of the negotiable instrument using the images of the one or more elements of the negotiable instrument and the non-element portions of the image of the negotiable instrument that was previously stored as white space.

3. The system of claim 2, wherein the generated second image of the negotiable instrument comprises a first portion with a first image resolution and a second portion with a second image resolution.

4. The system of claim 1, wherein the processing device is further configured to:
　separate the elements of the negotiable instrument and the non-element portions of the negotiable instrument into a plurality of quadrants, wherein the processing device stores the quadrants comprising elements of the negotiable instrument in a first image resolution and the quadrants comprising non-element portions of the negotiable instrument in a second image resolution.

5. The system of claim 1, wherein the processing device is further configured to:
　bifurcate the one or more images of the elements of the negotiable instrument and the non-element portions of the negotiable instrument such that the one or more images of the elements of the negotiable instrument can be stored with a higher image quality than the non-element portions of the negotiable instrument.

6. The system of claim 1, wherein the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

7. A computer-implemented method for capturing and storing elements of a negotiable instrument for use in image recreation, the computer-implemented method comprising:
　providing a computer processor executing non-transitory computer-readable instruction code specifically structured to cause the computer processor to:
　　receive an image of the negotiable instrument, wherein the image of the negotiable instrument comprises one or more elements that are used for processing the negotiable instrument and non-element portions that are not used in processing the negotiable instrument;
　　capture, using the image capture device, images for each of the one or more elements of the negotiable instrument, wherein the images comprise at least a payor signature image, an amount image, and a payor information image;
　　alter the resolution of the image of at least the payor signature image and the amount image to a first resolution;
　　alter the resolution of at least the payor information image to a second resolution, wherein the second resolution is lower than the first resolution;
　　alter the resolution of the non-element portions of the image of the negotiable instrument to a third resolution, wherein the third resolution is lower than the second resolution;
　　store the images of the one or more elements of the negotiable instrument in the database;
　　store, as white space, the non-element portions of the image of the negotiable instrument in the database at a lower resolution than the resolution of each of the images of the one or more elements;
　　receive a request from a user to retrieve information associated with the negotiable instrument, wherein the information comprises a user selection of one or more specific elements associated with the negotiable instrument;
　　retrieve from the database, the one or more specific elements selected by the user based on at least the received request; and
　　generate a partial image of the negotiable instrument based on at least the one or more retrieved specific elements selected by the user.

8. The computer-implemented method of claim 7, wherein the computer processor is further executing computer-readable instruction code specifically configured to cause the computer processor to:
　generate a second image of the negotiable instrument using the images of the one or more elements of the negotiable instrument and the non-element portions of the image of the negotiable instrument that was previously stored as white space.

9. The computer-implemented method of claim 8, wherein the generated second image of the negotiable instrument comprises a first portion with a first image resolution and a second portion with a second image resolution.

10. The computer-implemented method of claim 7, wherein the computer processor is further executing computer-readable instruction code specifically configured to cause the computer processor to:
　separate the elements of the negotiable instrument and the non-element portions of the negotiable instrument into a plurality of quadrants, wherein the processing device stores the quadrants comprising elements of the negotiable instrument in a first image resolution and the quadrants comprising non-element portions of the negotiable instrument in a second image resolution.

11. The computer-implemented method of claim 7, wherein the computer processor is further executing computer-readable instruction code specifically configured to cause the computer processor to:
　bifurcate the one or more images of the elements of the negotiable instrument and the non-element portions of the negotiable instrument such that the one or more images of the elements of the negotiable instrument can be stored with a higher image quality than the non-element portions of the negotiable instrument.

12. The computer-implemented method of claim 7, wherein the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

13. A computer program product for capturing and storing elements of a negotiable instrument for use in image recreation, the computer program product comprising a non-transitory computer-readable medium, wherein the non-transitory computer-readable medium comprises one or more computer-executable program code portions that, when executed by a computer, cause the computer to:
　receive an image of the negotiable instrument, wherein the image of the negotiable instrument comprises one or more elements that are used for processing the negotiable instrument and non-element portions that are not used in processing the negotiable instrument;
　capture, using the image capture device, images images for each of the one or more elements of the negotiable instrument, wherein the images comprise at least a payor signature image, an amount image, and a payor information image;

alter the resolution of at least the payor signature image and the amount image to a first resolution;

alter the resolution of at least the payor information image to a second resolution, wherein the second resolution is lower than the first resolution;

alter the resolution of the non-element portions of the image of the negotiable instrument to a third resolution, wherein the third resolution is lower than the second resolution;

store the images of the one or more elements of the negotiable instrument in the database;

store, as white space, the non-element portions of the image of the negotiable instrument in the database at a lower resolution than the resolution of each of the images of the one or more elements;

receive a request from a user to retrieve information associated with the negotiable instrument, wherein the information comprises a user selection of one or more specific elements associated with the negotiable instrument;

retrieve from the database, the one or more specific elements selected by the user based on at least the received request; and generate a partial image of the negotiable instrument based on at least the one or more retrieved specific elements selected by the user.

14. The computer program product of claim 13, wherein the one or more computer-executable program code portions, when executed by the computer, cause the computer to: generate a second image of the negotiable instrument using the images of the one or more elements of the negotiable instrument and the non-element portions of the image of the negotiable instrument that was previously stored as white space.

15. The computer program product of claim 13, wherein the one or more computer-executable program code portions, when executed by the computer, cause the computer to: separate the elements of the negotiable instrument and the non-element portions of the negotiable instrument into a plurality of quadrants, wherein the processing device stores the quadrants comprising elements of the negotiable instrument in a first image resolution and the quadrants comprising non-element portions of the negotiable instrument in a second image resolution.

16. The computer program product of claim 13, wherein the one or more computer-executable program code portions, when executed by the computer, cause the computer to: bifurcate the one or more images of the elements of the negotiable instrument and the non-element portions of the negotiable instrument such that the one or more images of the elements of the negotiable instrument can be stored with a higher image quality than the non-element portions of the negotiable instrument.

17. The computer program product of claim 13, wherein the negotiable instrument is a check, and wherein the images of the one or more elements of the negotiable include, at least, one of a Name, Address, Date, Check number, Payee, Check amount, Check amount line, Memo, Signature line, Routing and transit number, and Checking account number located on the image of the check.

* * * * *